UNITED STATES PATENT OFFICE.

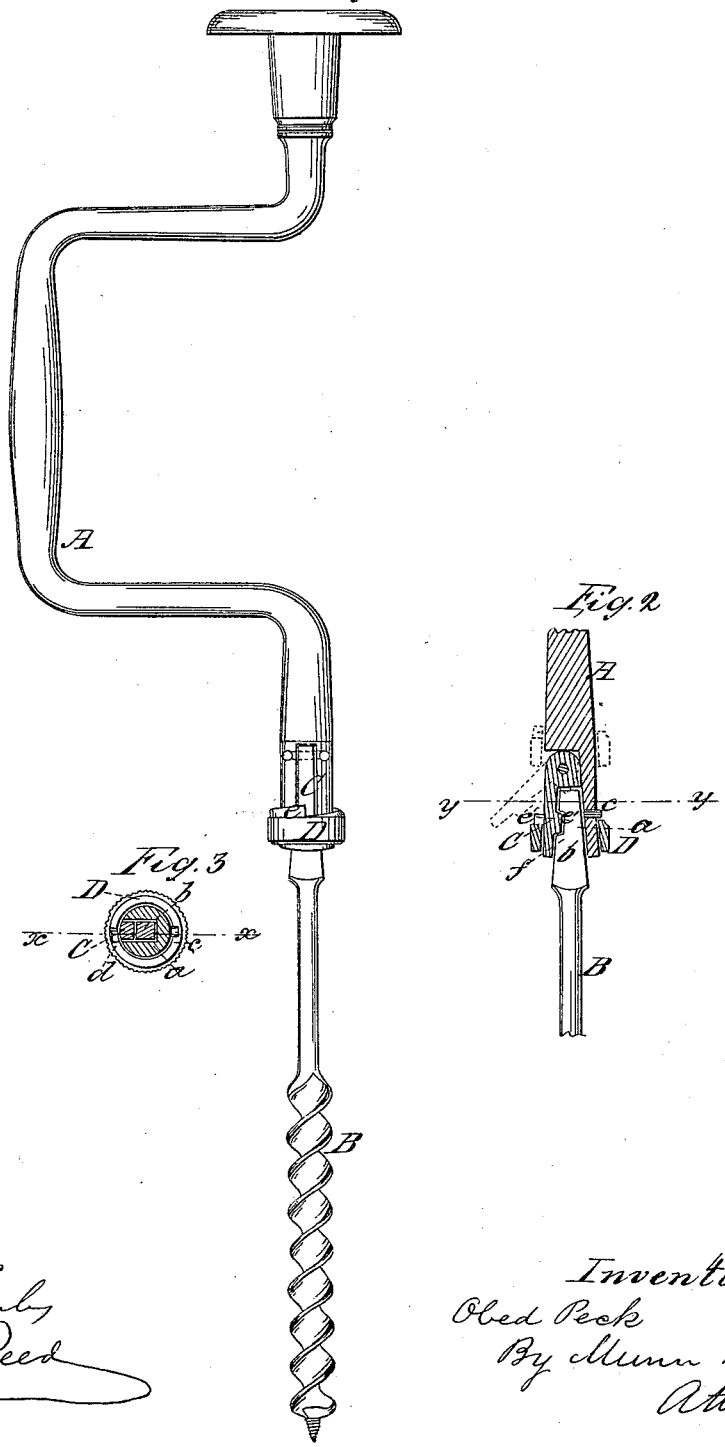

OBED PECK, OF WINDSOR, VERMONT.

IMPROVEMENT IN ATTACHING BITS TO BRACES.

Specification forming part of Letters Patent No. 40,275, dated October 13, 1863.

*To all whom it may concern:*

Be it known that I, OBED PECK, of Windsor and State of Vermont, have invented a new and Improved Mode of Attaching Bits to Braces or Bit-Stocks and to Handles; and I do hereby declare that the following is a full, clear, and exact description of the same, reference being had to the accompanying drawings, making a part of this specification, in which—

Figure 1 is a side view of a brace or bit-stock with a bit secured in it according to my invention; Fig. 2, a longitudinal section of the end of the same, taken in the line $x\,x$, Fig. 3; Fig. 3, a transverse section of the same, taken in the line $y\,y$, Fig. 2.

Similar letters of reference indicate corresponding parts in the several figures.

This invention consists in the employment or use of a hinged jaw fitted in the bit end of the brace, and using in connection therewith a collar which is placed on the bit end of the brace, and provided with an annular inclined plane at its inner end, which acts against a pin attached to the brace, all being arranged in such a manner as to admit of the bit being readily secured in the brace or bit-stock or handle and readily detached therefrom.

To enable those skilled in the art to fully understand and construct my invention, I will proceed to describe it.

A represents a joiner's brace or bit-stock, the main part of which is constructed in the usual or in any proper way.

The outer or bit end of the brace has a taper square hole, $a$, made in it to receive the square taper shank $b$ of the bit B, and this end of the brace is cut longitudinally and centrally a proper distance, and then cut outward at right angles with the longitudinal part to form a separate piece, C, which is pivoted to the main part of the brace to form a jaw, which may be adjusted snugly to the main part or be thrown out from it, as shown in red outline in Fig. 2. This bit end of the brace is of taper form, and it has a collar, D, upon it, the interior of which is of taper form corresponding to the conical form of the end of the brace.

To the brace there is attached a short horizontal pin, $c$, and a notch, $d$, is made in the inner side of the collar to admit of the collar being shoved over the pin. At the inner end of the collar D there is an annular inclined plane, $e$. (Shown in Figs. 1 and 2. S.)

At the inner side of the jaw C there is a projection, $e'$, which, when the jaw is closed, fits into a recess, $f$, in the shank $b$, as shown clearly in Fig. 2.

The jaw C is secured in close contact with the shank $b$ by means of the collar D, which is shoved along on the end of the brace and over the pin $c$, and then turned so that the annular inclined plane $e$ will act against the pin $c$, and force the collar toward the extreme end of the brace, the conical or taper form of the latter, in connection with the taper form of the interior of the collar, causing the collar to bind firmly on the brace and jaw, and secure the shank $b$ in the brace. The shank $b$ is detached from the brace by simply turning the collar D in a reverse direction until the notch $d$ comes in line with the pin $c$, and then shoving the collar D inward free from the jaw to admit of the latter being shoved outward from the shank, as shown in red in Fig. 2.

The hinged jaw C has been used in connection with a screw cut on the brace and a nut fitted thereon to keep the jaw in contact with the shank. This arrangement, although efficient, is comparatively expensive to manufacture, and the within-described invention on the score of economy is an improvement on the screw and nut above referred to, which was also invented by me.

Having thus described my invention, what I claim as new, and desire to secure by Letters Patent, is—

The jaw C, hinged to the brace or handle or connected therewith by a joint, in combination with the collar D, provided with the annular inclined plane $c$ at its lower edge, and the pin $d$, attached to the brace or handle, substantially as and for the purpose set forth.

OBED PECK.

Witnesses:
THOS. S. J. DOUGLAS,
GEO. W. REED.